（12) United States Patent
Barton et al.

(10) Patent No.: US 9,257,884 B2
(45) Date of Patent: Feb. 9, 2016

(54) COOLING SYSTEM AND GEARED MOTOR

(75) Inventors: Peter Barton, Bretten (DE); Stefan Dietrich, Karlsruhe (DE); Gerhard Dittes, Gondelsheim (DE); Martin Doppelbauer, Bretten (DE); Matthias Hauck, Schwetzingen (DE); Michael Haug, Bretten (DE); Torsten Koker, Stutensee (DE); Marek Lewandowski, Renningen (DE); Friedhelm Metzler, Bad Schonborn (DE); Josef Schmidt, Graben-Neudorf (DE); Ingo Schuetterle, Sigmaringen (DE); Mario Zucker, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 307 days.

(21) Appl. No.: 13/992,414

(22) PCT Filed: Dec. 5, 2011

(86) PCT No.: PCT/EP2011/006079
§ 371 (c)(1),
(2), (4) Date: Jun. 7, 2013

(87) PCT Pub. No.: WO2012/076142
PCT Pub. Date: Jun. 14, 2012

(65) Prior Publication Data
US 2013/0257198 A1    Oct. 3, 2013

(30) Foreign Application Priority Data
Dec. 9, 2010  (DE) .................. 10 2010 054 028

(51) Int. Cl.
*H02K 9/00* (2006.01)
*H02K 9/19* (2006.01)
*H02K 5/20* (2006.01)
*H02K 7/116* (2006.01)
*H02K 16/00* (2006.01)

(52) U.S. Cl.
CPC .. *H02K 9/19* (2013.01); *H02K 5/20* (2013.01); *H02K 7/116* (2013.01); *H02K 16/00* (2013.01)

(58) Field of Classification Search
CPC ........... H02K 5/20; H02K 9/19; H02K 16/00; H02K 7/116
USPC ...... 310/52, 54, 58, 60 R, 60 A, 64, 112, 113, 310/114, 83
See application file for complete search history.

(56) References Cited

U.S. PATENT DOCUMENTS 5,372,213 A  * 12/1994  Hasebe et al. ............... 180/65.6
5,532,535 A  *  7/1996  Oltmanns ....................... 310/90

(Continued)

FOREIGN PATENT DOCUMENTS

| DE | 44 02 337 | 8/1995 |
|---|---|---|
| EP | 1 319 866 | 6/2003 |
| WO | 03/065546 | 8/2003 |

OTHER PUBLICATIONS

International Search Report, dated Sep. 17, 2012, issued in corresponding International Application No. PCT/EP2011/006079.

*Primary Examiner* — Hanh Nguyen
(74) *Attorney, Agent, or Firm* — Kenyon & Kenyon LLP (57) ABSTRACT

A cooling system for a geared motor, and a geared motor having electric motors and a gear unit as well as an adapter which is disposed between the electric motors and the gear unit, the electric motors having ducts for a coolant, in particular, a coolant, especially a cooling liquid, being able to flow through each of the motors which, in particular, are liquid-cooled, the streams of coolant emerging from the ducts being brought together and being fed at least proportionally by a first distributor to the gear unit in order to lubricate and cool the toothing parts of the gear unit.

17 Claims, 7 Drawing Sheets

(56) References Cited

U.S. PATENT DOCUMENTS

2005/0140230 A1 6/2005 Johnson et al.
2007/0120427 A1 5/2007 Iund et al.
2008/0238098 A1 10/2008 Becquerelle et al.
2012/0091835 A1* 4/2012 Kim et al. .................. 310/54

* cited by examiner

COOLING SYSTEM AND GEARED MOTOR

FIELD OF THE INVENTION

The present invention relates to a cooling system and a geared motor.

European Published Patent Application No. 1 319 866 describes a geared motor having a single motor housing and a plurality of electric motors disposed in motor accommodations. In that case, a coolant is provided between the electric motors, which means the electric motors are disposed so as not to be visible from outside.

German Published Patent Application No. 44 02 337 describes a drive system having a plurality of electric motors which are situated in a motor bearing block.

SUMMARY

Example embodiments of the present invention provide a drive system, which may improve the environmental protection.

Among features in the case of the cooling system for a geared motor, having electric motors and a gear unit as well as an adapter situated between the electric motors and the gear unit, are that the electric motors have ducts for a coolant, in particular a coolant, especially a cooling liquid, being able to flow through each of the motors, which in particular, are liquid-cooled,
the streams of coolant emerging from the ducts being brought together and being fed at least proportionally by a first distributor to the gear unit in order to lubricate and cool the toothing parts of the gear unit.

This is advantageous, because the coolant is useable to lubricate toothing parts of the gear unit. Thus, driving electric motors and the gear unit driven by them are able to be cooled together, with only one cooling circuit for a coolant. In addition, lubrication is therefore also able to be carried out, thereby permitting a reduction in the development of heat in the gear unit.

In example embodiments, the streams of coolant emerging from the ducts are brought together and fed at least proportionally by the first distributor to a summation gear situated in the adapter, in order to lubricate and cool the toothing parts of the summation gear. The advantage in this case is that not only the gear unit, but also a summation gear, which is located in the adapter, is able to be cooled and lubricated, as well.

In example embodiments, the oil pan of the gear unit and the oil pan of the summation unit are interconnected for the pass-through of coolant, a pump delivering coolant from the oil pan. The advantage here is that the two gears have one oil pan in common, which may even be enlarged in volume by an oil-tank container. In this manner, parts dipping or dipped into the oil pan are lubricated. In addition, a buffer is provided in the event the delivery rate of the pump fluctuates.

In example embodiments, the pump delivers the coolant to an oil filter and/or to an oil cooler. This has the advantage that an active delivery is provided and therefore a high flow rate is attainable, resulting in very effective cooling.

In example embodiments, the coolant conducted through the oil cooler is fed to the electric motors. This is advantageous, because the cooled coolant absorbs the heat from the electric motors, and after that, is conductible through the gear unit which is thermally less sensitive compared to the motor.

In example embodiments, a fan is provided at the oil cooler, in particular, a stream of cooling air, propelled by the fan with the fan motor, flowing on the surface of the oil cooler, in particular, the fan motor being an electric motor, especially one of the geared-motor electric motors connected to the adapter flange. This offers the advantage that an effective cooling is attainable. In particular, using one electric motor of the geared motor as fan motor, e.g., by connecting the fan on a projecting B end of a motor shaft of the electric motor, it is possible to dispense with an additional electric motor. However, the rotational speed of the fan is then a function of the rotational speed of the electric motor.

In example embodiments, the first distributor is disposed outside of the adapter, the streams of coolant emerging from the motors reuniting in the wall of the adapter flange, and the at least proportional coolant stream being conducted through a through-opening in the wall of the adapter flange, to the spatial area of the summation gear. The advantage in this case is that the stream of coolant supplied to the summation gear is controllable in easy fashion, namely, by measures at the distributor which is readily accessible from outside.

In example embodiments, a geared motor is implemented such
the geared motor has electric motors and a gear unit, as well as an adapter which is disposed between the electric motors and the gear unit,
the gear unit having an input shaft and an output shaft,
each motor having a rotor shaft,
the adapter having an adapter flange forming a housing,
the adapter flange at least partially surrounding a summation gear in housing-forming fashion, particularly in order to bring the power currents generated by the motors together at the input shaft of the gear unit,
a coolant, especially a cooling liquid, being able to flow through each of the motors, which in particular, are liquid-cooled,
the motors having an outlet for the coolant,
ducts being formed on the adapter flange which bring the coolant, emerging at the respective outlet of a motor, together to one outlet, especially to a single outlet in common, on the adapter flange.

This offers the advantage of a modular-like construction, in which each individual motor is exchangeable quickly and easily without it being necessary to drain the entire coolant beforehand, for a motor is easily exchangeable, since it is freely accessible from the B end.

Thus, it only has to be released from the adapter flange and then exchanged. In addition, the motors are disposed so as to be visible from outside. Therefore, damage, such as damage due to corrosion, for instance, is quickly and easily discernible. Moreover, in accordance with the number of motors selected, the power output by the motors may be adapted easily and rapidly to the demand.

In addition, the respective pinions are seated on the respective motor shaft and need no separate support.

Inflows and drains are located on different sides of the motors. The output of the individual motors is able to be summed up with the assistance of the summation gear.

In example embodiments, the input shaft of the gear unit is supported in a housing part of the gear unit, especially a bearing cup,
in particular, the housing part being adjusted to a further housing part of the gear unit by a centering collar, and joined. This is advantageous, because the center gear is supported jointly together with the driving pinion of the gear unit, thus, the first toothing part of the first gear stage of the gear unit. Therefore, no additional support needs to be used for the center gear. In addition, an existing gear unit is easily alterable for purposes of the present invention, in which a multiple-motor drive is used. Thus, only a small degree of modification is necessary. In particular, an adapter, necessary in any case, is able to be retrofitted between motor and gear unit and furnished with the functions of the present invention, thus, the summation gear, the housing formation for the summation gear, the provision of the centering between the gear unit and motors, as well as the reuniting of the coolant.

In example embodiments, the summation gear has a center gear, particularly a toothing part, especially a spur gear which is mounted in rotatably fixed manner on the input shaft of the gear unit, a toothing being formed on each rotor shaft or a toothing part being joined to each rotor shaft, especially pinions having toothing being joined in rotatably fixed manner to the rotor shaft, the pinions meshing with the center gear. This is advantageous because the summation gear needs no separate support, but rather, all rotatably mounted parts of the summation gear jointly use the support—necessary in any case—of the motor shafts or of the input shaft.

In example embodiments, the adapter flange forms a housing for the summation gear. This offers the advantage that a summation gear is able to be integrated in the adapter between the gear unit and motor, and it is surroundable without support but with housing function. Thus, even given a comparatively tight construction, a lubricant is able to be provided in the summation gear. In this context, the adapter flange acts as housing part for the summation gear.

In example embodiments, the adapter flange is constructed in two pieces, so that it has a sheet metal on which the ducts are formed, in particular, are milled in as depression, especially as groove. The advantage in this instance is that ducts for bringing the coolant together are able to be provided, especially in inexpensive and uncomplicated manner, in the adapter flange.

In example embodiments, the outlet of the motors in each case is connected imperviously to an inlet formed on the adapter flange, i.e., to an inlet formed from the sheet metal of the adapter flange, to a duct, in particular, the inlet being the mouth of one of the respective ducts. The advantage in this case is that the streams of coolant flowing out of the motors are able to be fed into the adapter flange and brought together there.

In example embodiments, the motors, or to be more precise, the pinion toothings disposed on the rotor shafts of the motors, are set apart uniformly from each other in the circumferential direction of the gear-unit input shaft. This offers the advantage that a uniform force distribution is attainable, and therefore no significant transverse-force loading develops, thus, the loading for the support remains low. In addition, this set-up also allows the center gear to be supported on the pinion toothings at the periphery, and therefore vibrations are also reducible.

In example embodiments, a pinion joined in rotatably fixed manner onto the rotor shaft of a motor is supported only via the two bearings of the rotor shaft. The advantage in so doing is that no additional support is necessary.

In example embodiments, the center gear is supported with the gear-unit input shaft in a housing part, especially a bearing cup, of the gear unit. The advantage in so doing is that no additional support is needed for the center gear.

In example embodiments, the adapter flange has a centering means which is adjustable to a centering means, particularly a centering collar, of the gear-unit housing part, especially of the bearing cup, in particular, the adapter flange and bearing cup being releasably joined, especially being screw-connected. The advantage here is that the motors are alignable toward the gear-unit housing via the adapter flange.

In example embodiments, located on the adapter flange is an accommodation, especially an accommodation opening, which has a centering device, particularly a centering collar, to which the end shield of a motor is adjusted. The advantage is this case is that centering is achievable in an easy manner.

In example embodiments, coolant ducts of the stator housing of the motor are brought together in the end shield at one opening area in common as outlet, in particular, in the other end shield of the motor, the coolant ducts of the stator housing of the motor being brought together to one opening area in common as inlet for the coolant. This is advantageous because only a single inlet and outlet, respectively, are necessary. Consequently, in this case, only one tight connection is necessary. The further duct structure is easily sealable within the motor parts.

In example embodiments, the summation gear is lubricated with cooling liquid, by running a through-opening, especially a connecting duct, from the spatial area of the summation gear to a duct of the adapter flange. The advantage in so doing is that lubrication may be accomplished in an uncomplicated manner, and thus no great expenditure is necessary for that purpose; this especially holds true when using oil as coolant.

Further features and aspects of example embodiments of the present invention are explained in greater detail below with reference to the appended Figures.

DETAILED DESCRIPTION

In the drive represented schematically in the figures, each motor has an output-side A end shield 1, in which a bearing 61 for the rotor shaft of the motor is disposed, and an end shield 3 at the axially other end, thus the end facing way from the gear unit, thus B end shield 3, in which a further bearing 59 of the rotor shaft is provided.

A end shield 1 and B end shield 3 are connected by stator housing 2, which encompasses stator 57. The reversing sections of the stator winding, thus winding heads 60, project axially from stator 57.

Motor shaft 22 bears rotor lamination 58, at its axial end area, pinion 63 is joined in rotatably fixed manner, particularly by a feather key connection.

The motors are uniformly constructed. Their pinions 63 are engaged with center gear 62 that is joined in rotatably fixed manner to gear-unit input shaft 66 which bears input pinion 67. Input shaft 66 is supported via bearings 55, 65 in a housing part of the gear unit, namely, a bearing cup 7, which is joined to gear-unit housing 70. Bearings 55 and 65 are preloaded by a shaft nut 64. Shown in gear-unit housing 70 are output shaft 50 and the respective toothing parts engaging with each other, such as pinions 51, 53 and associated gear wheels, as well as intermediate shafts 52, 54.

Disposed on bearing cup 7 is a centering flange 56 which is joined to an adapter flange 10 that at least partially surrounds—while forming a housing for—the summation gear having center gear 62 and engaging pinions 63.

Adapter flange 10 has openings 42 for accommodating the motors, especially for accommodating A end shields 1 of the motors. Also located at each edge area of an opening 42 is a centering collar 31, so that the motors are adjustable to it and able to be centered. This permits a highly precise positioning of the motors. Consequently, this also makes it possible to feed the coolant, emerging from a motor, to an inlet 30 in the adapter flange.

Heat is able to be extracted from each motor by the coolant, the coolant flowing through an inlet 5 at B end shield 3 into ducts in the respective motor, which are located in stator housing 2, and at the other axial end, thus, at A end shield 1, flowing through outlet 20 into inlet 30 of the adapter flange.

Thus, an effective traversal by flow, and therefore also extraction of heat, is made possible.

In adapter flange 10, the coolant flowing in is brought together through ducts 40, which are milled in in a sheet-metal part welded onto the remaining adapter flange. The streams of coolant brought together are then able to be brought out through outlet 4.

Thus, on one hand, adapter flange 10 has the function of a housing part for the summation gear, and on the other hand, the function of reuniting and conducting the coolant out from the individual motors. In addition, it connects the motors to gear-unit housing 70 and makes it possible to align and center the motors relative to the gear unit.

Thus, with the aid of bearing cup 7, gear-unit housing 70 is used to support center gear 62. The motors are used to support the pinions via motor shaft 22 supported in the motor housing.

Consequently, the adapter flange transmits the alignment of the motors with respect to gear-unit house 70 with associated bearing cup 7.

Figure 1:
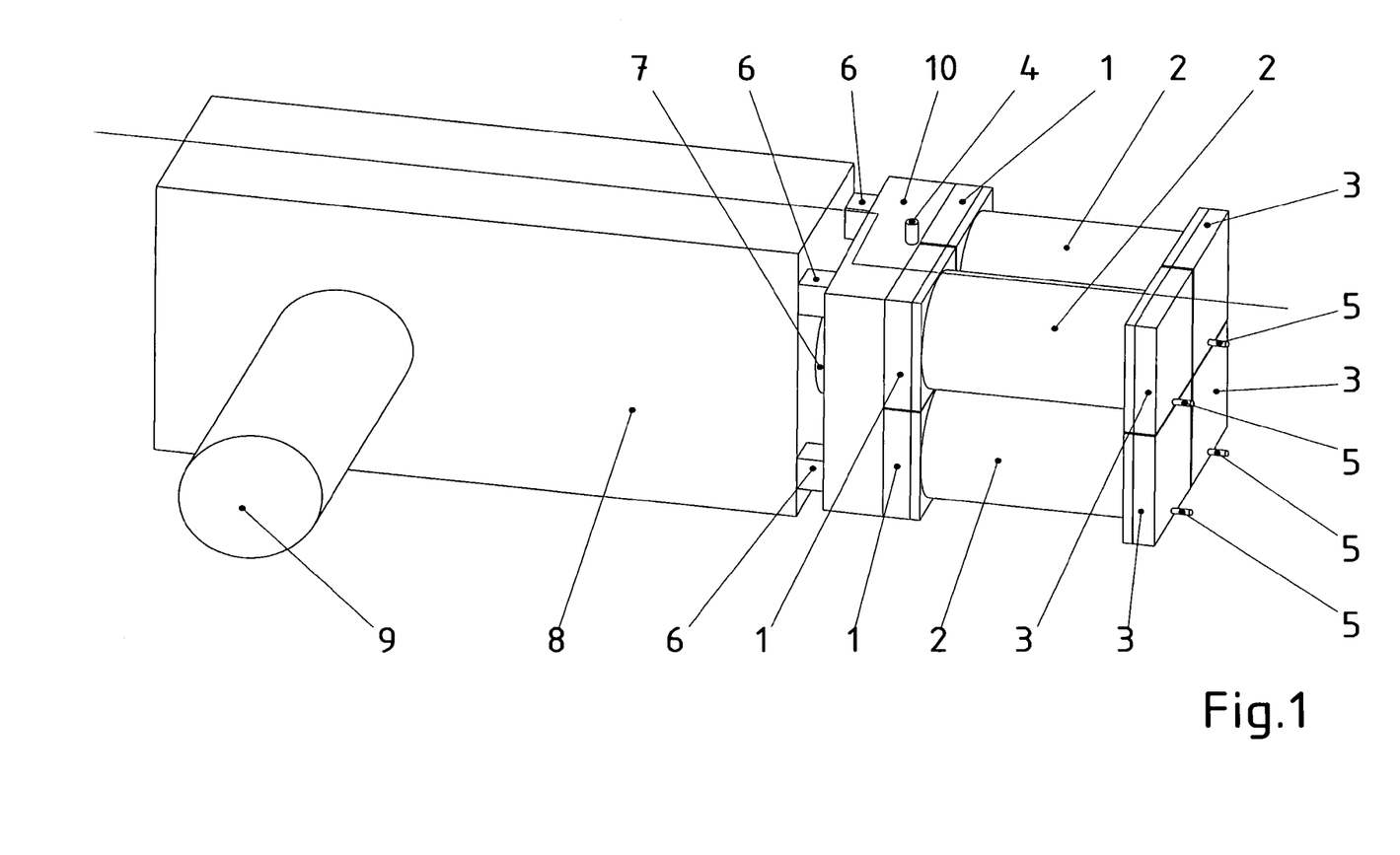
FIG. 1 shows a drive according to an example embodiment of the present invention having a gear unit driven by four motors, the torque from the four motors being supplied via a summation gear to the gear-unit input shaft.
Figure 2:
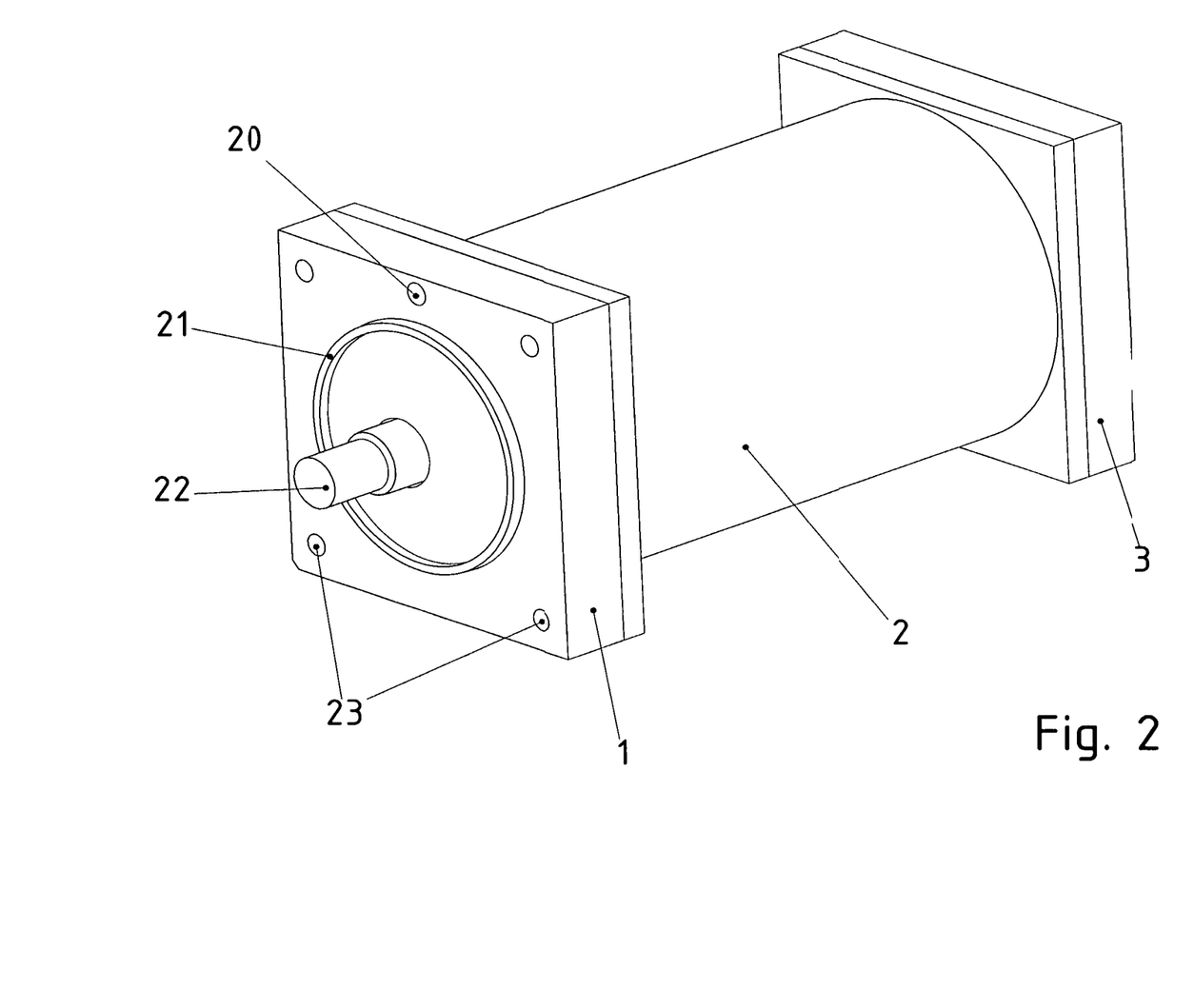
FIG. 2 shows one of the motors in an oblique view.
Figure 3:
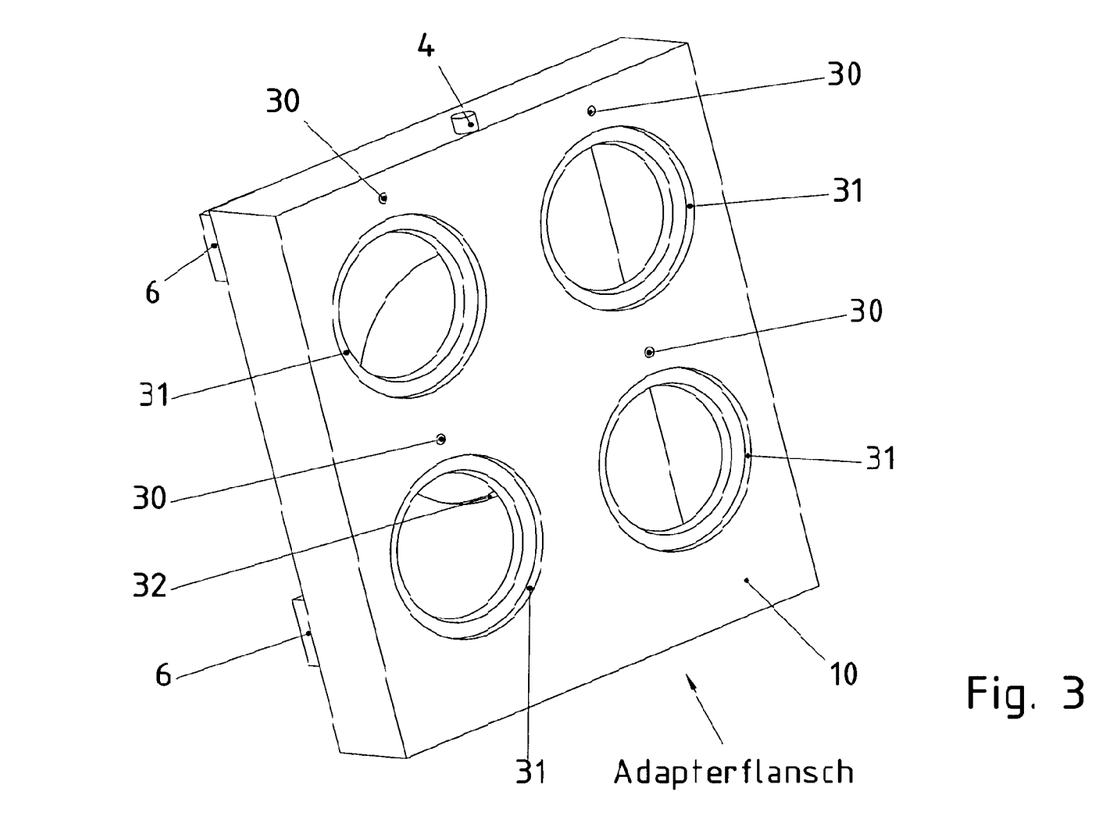
FIG. 3 shows an adapter flange 10 in an oblique view.
Figure 4:
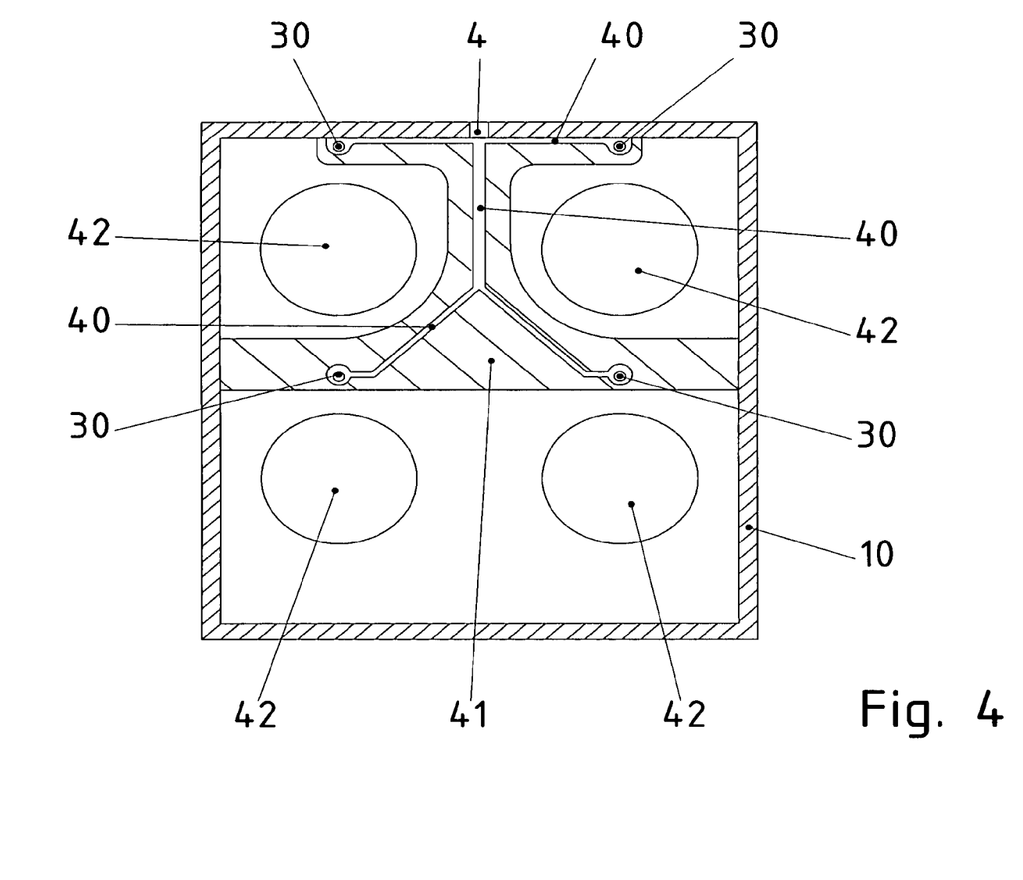
FIG. 4 shows a top view of a sheet metal on adapter flange 10.
Figure 5:
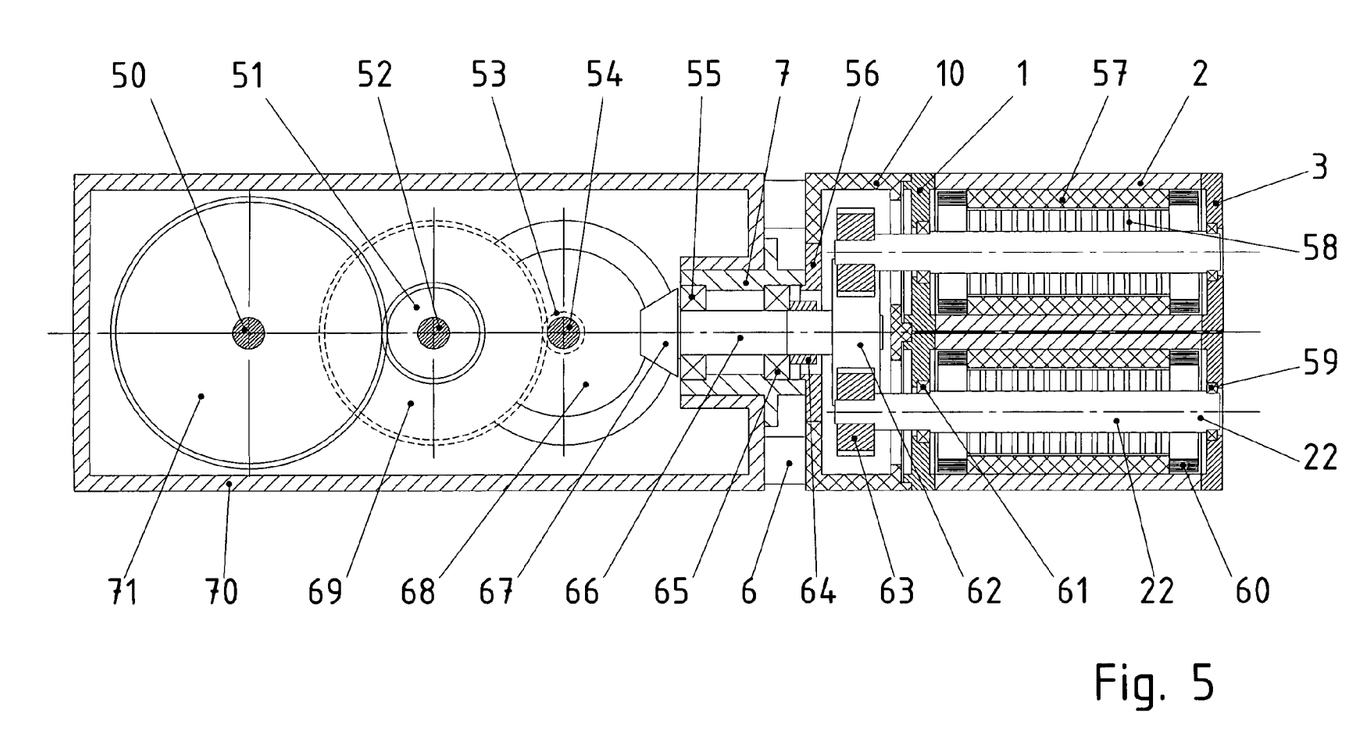
FIG. 5 shows a cross section through the drive.

As shown in FIG. 1, spacers 6 may be provided between adapter flange 10 and gear-unit housing 8, 70. Better accessibility is therefore attainable, especially to the area of bearing cup 7. In addition, it becomes possible to fix the adapter flange in position on few surfaces, so that only a little machining is necessary on gear-unit housing 8, 70.

Each of the motors has an inlet 5 for coolant. All inlets 5 are able to be fed from one coolant source in common. The combined coolant is brought out at outlet 4 and preferably is conducted directly or via a cooler to the coolant source.

In the case of each motor, outlet 20 for coolant is connectable imperviously by a seal to inlet 30 on the sheet metal of the adapter flange.

Centering collar 21 located on end shield 1 on the A end permits a precise orientation of the motors to centering collar 31 of the adapter flange, so that the pinion joined in rotatably fixed manner onto motor shaft 22 is aligned precisely with respect to center gear 62.

Preferably, the stator housing has axially extending coolant ducts aligned parallel to each other and set apart from each other in the circumferential direction, the coolant conducted through the coolant ducts being brought together with the aid of an annular groove located in A end shield 1 and extending round in the circumferential direction, and being brought out at outlet 20.

End shield 1 is joined to stator housing 2 by screws which are in fastening bores 23.

Located on the adapter flange is a centering device 32 for a centering flange, by which adapter flange 10 is able to be centered on bearing cup 7.

In example embodiments of the present invention, the geared motor is furnished with a cooling system having a coolant circuit for a coolant, in particular, having a system of piping and ducts.

Figure 6:
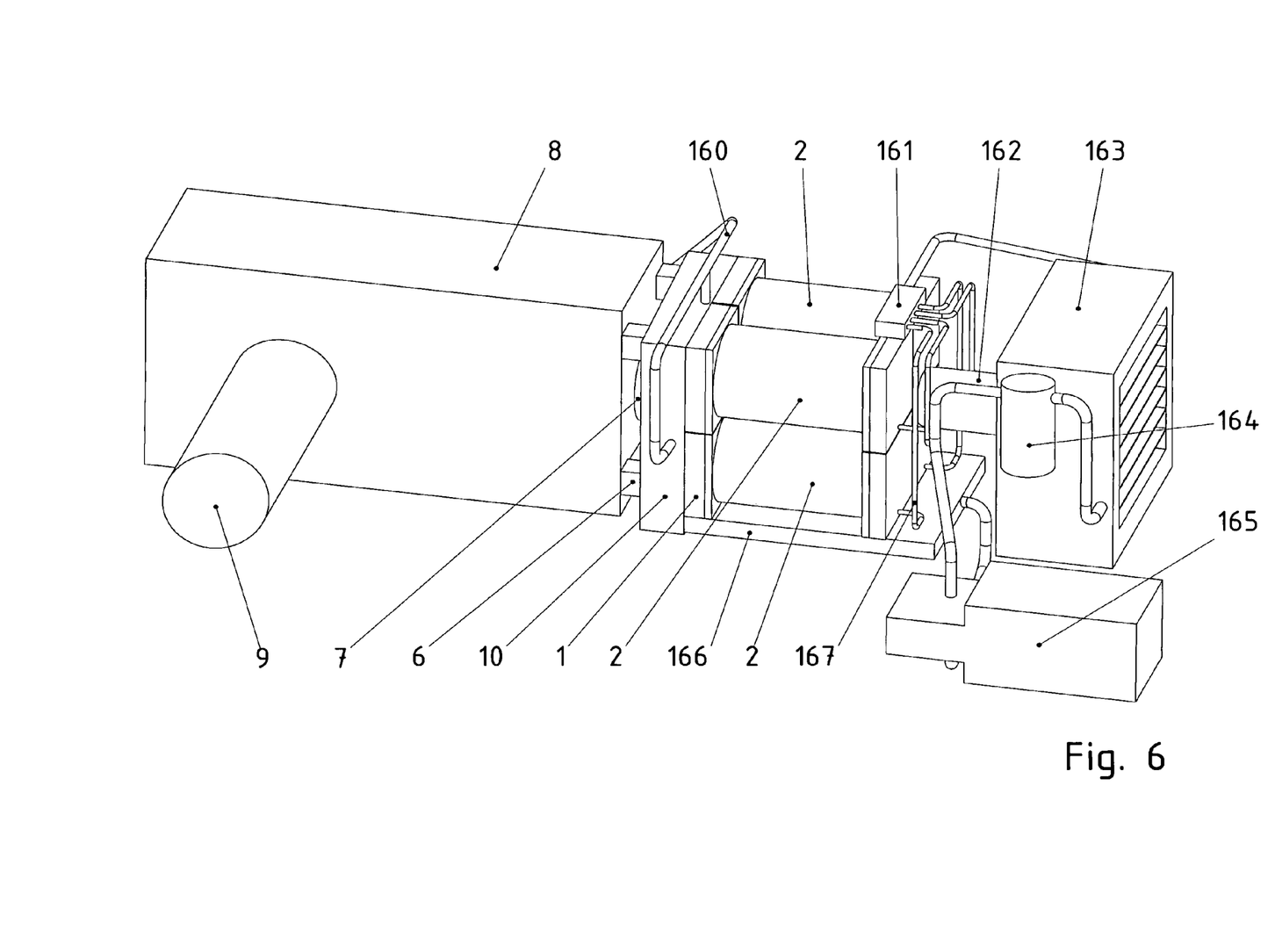
FIG. 6 shows the drive according to an example embodiment of the present invention together with the associated cooling system.
Figure 7:
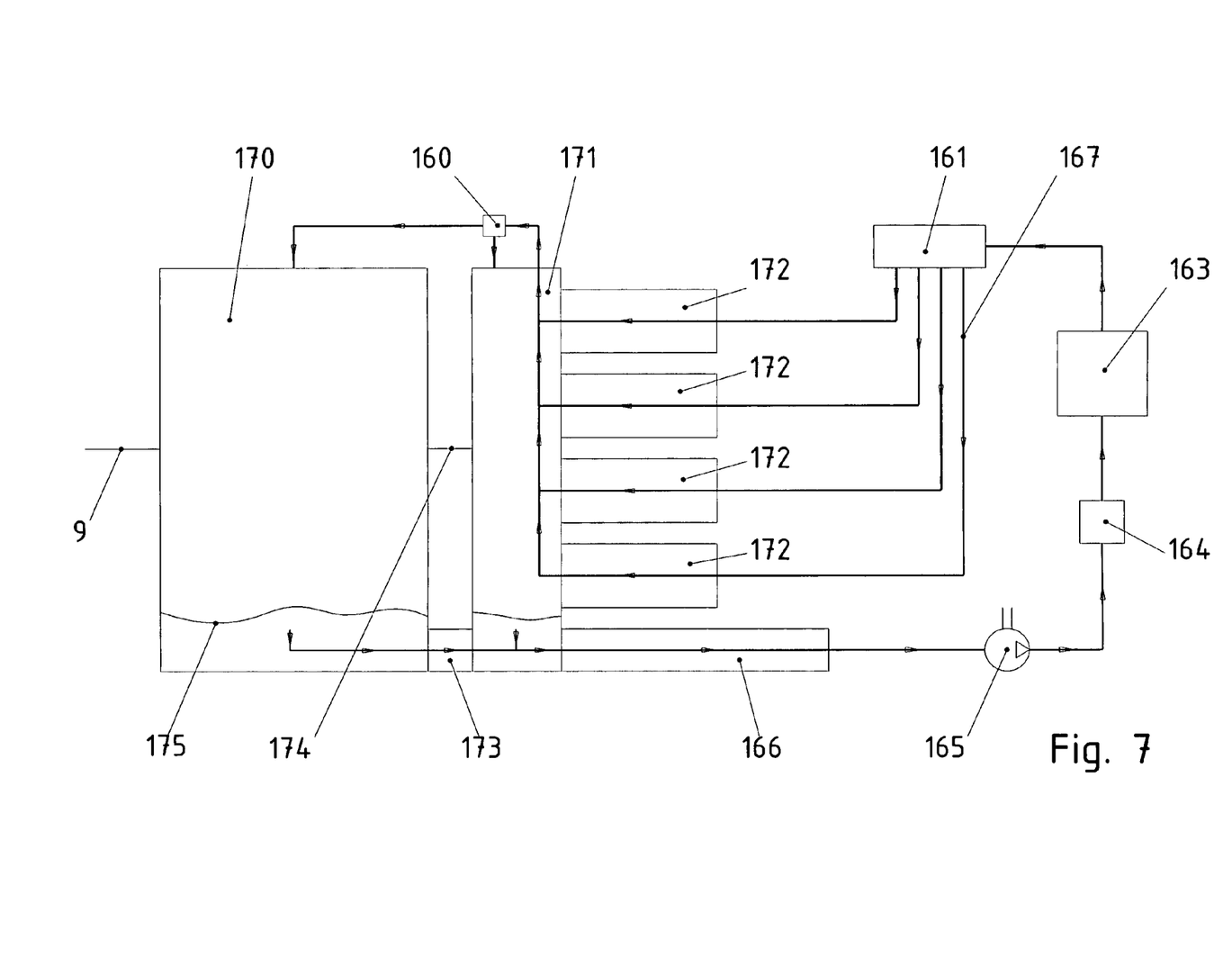
FIG. 7 shows the coolant circuit schematically.

As shown in FIGS. 6 and 7, the coolant conducted through stator housing 2 of electric motors 172 and brought together in adapter flange 10 is delivered to a distributor 160 which is secured on adapter flange 10.

From distributor 160, coolant is supplied via a first pipe to summation gear 171, thus into the inside space surrounded by adapter flange 10 in house-forming fashion, in order to lubricate and at the same time to cool summation gear 171. To that end, a through-opening is provided in the wall of the adapter flange, through which the coolant is fed to summation gear 171.

The coolant dripping off downward in summation gear 171 forms an oil pan which is connected to an oil-tank container 166 and to the oil pan of gear unit 170. The oil pan of gear unit 170 is retained by gear-unit housing 8.

From distributor 160, coolant for lubrication and simultaneous cooling is fed via a second pipe to gear unit 170, the coolant dripping off downward again being collected in the oil pan. The oil pan has level 175, which admittedly is only fuzzily discernible during operation, owing to foam and/or waves.

Thus, the oil pan of gear unit 170 is in a state of interchange with oil-tank container 166 and the oil pan of summation gear 171 in adapter flange 10. To that end, a connecting device 173 is provided which is joined imperviously to gear-unit housing 8 of gear unit 170 and to adapter flange 10, and which has an opening passing through from the oil pan of gear unit 170 up to the oil pan in adapter flange 10.

With the aid of an oil pump 165, coolant is conveyed out of oil-tank container 166, thus also out of the respective oil pan of gear 170, 171, and supplied via an oil filter 164 to an oil cooler 163, from which heat is extracted by a fan having fan motor 162. Since fan motor 162 is operable independently of the other motors 172, an effective cooling of the coolant, and therefore also dissipation of the heat to the surroundings is made possible.

From the oil cooler, the coolant from which the heat has been extracted, thus, the cooled coolant, is fed to a further distributor 161, from which motors 172 are supplied with coolant, thus, the coolant is supplied to the respective end shield on the B end, in which it is distributed to the individual ducts in stator housing 2 of respective electric motor 172. In the end shield on the A end, the coolant emerging from the coolant ducts in stator housing 2 is brought together and fed via one shared outlet from the end shield on the A end to adapter flange 10, in which all the streams of coolant emerging from motors 172 are reunited.

In FIG. 7, the input shaft of gear unit 170 supported in bearing cup 7 is denoted as shaft 174.

LIST OF REFERENCE NUMERALS

1. A end shield
2 Stator housing
3 B end shield
4 Outlet for coolant
5 Inlet for coolant
6 Spacer
7 Bearing cup
8 Gear-unit housing
9 Output shaft
10 Adapter flange
20 Outlet for coolant 21 Centering collar
22 Motor shaft
23 Fastening bores
30 Inlet for coolant
31 Centering collar
32 Centering device for centering flange
40 Duct
41 Welded-on sheet metal having welded-in ducts
42 Opening for accommodating a motor
50 Shaft
51 Pinion
52 Shaft
53 Pinion
54 Shaft
55 Bearing
56 Centering flange
57 Stator
58 Rotor lamination
59 Bearing
60 Winding head
61 Bearing
62 Center gear
63 Pinion
64 Shaft nut
65 Bearing
66 Shaft
67 Pinion
68 Gear wheel
69 Gear wheel
70 Gear-unit housing
71 Gear wheel
160 Distributor
161 Distributor
162 Fan motor
163 Oil cooler
164 Oil filter
165 Oil pump
166 Oil-tank container
167 Pipe
170 Gear unit
171 Summation gear
172 Electric motor
173 Connection
174 Shaft
175 Level

What is claimed is:

1. A cooling system for a geared motor, having electric motors, a gear unit, and an adapter disposed between the electric motors and the gear unit, comprising:
ducts for a coolant and/or a liquid coolant arranged in the electric motors, the coolant and/or the liquid coolant flowable through each of the motors;
a first distributor adapted to bring together streams of coolant emerging from the ducts and proportionally feed the streams of coolant emerging from the ducts to the gear unit to lubricate and cool toothing parts of the gear unit.

2. The cooling system according to claim 1, wherein the streams of coolant emerging from the ducts are brought together and fed at least proportionally by the first distributor to a summation gear located in the adapter, in order to lubricate and cool the toothing parts of the summation gear.

3. The cooling system according to claim 2, wherein an oil pan of the gear unit and an oil pan of the summation gear are interconnected to pass through coolant, the cooling system including a pump adapted to deliver coolant from the oil pan.

4. The cooling system according to claim 3, wherein an oil-tank container is connected to the oil pan, so that an increase in a coolant reservoir and/or volume, in equilibrium with the oil pan, is attainable.

5. The cooling system according to claim 3, wherein the pump is adapted to deliver the coolant to an oil filter and/or to an oil cooler.

6. The cooling system according to claim 5, wherein the coolant conducted through the oil cooler is fed to the electric motors.

7. The cooling system according to claim 5, wherein a fan is provided at the oil cooler, adapted to deliver a stream of cooling air flowing on a surface of the oil cooler, the fan including an electric motor.

8. The cooling system according to claim 7, wherein the electric motor of the fan corresponds to one of the geared-motor electric motors connected to an adapter flange.

9. The cooling system according to claim 1, wherein the first distributor is disposed outside of the adapter, the streams of coolant emerging from the motors reuniting in a wall of an adapter flange, and the at least proportional coolant stream being conducted through a through-opening in the wall of the adapter flange, to a spatial area of a summation gear.

10. A geared motor, comprising:
a cooling system as recited in claim 1,
wherein the gear unit includes an input shaft and an output shaft, each motor includes a rotor shaft, the adapter includes an adapter flange forming a housing, the adapter flange at least partially surrounding, and forming a housing for, a summation gear, in order to bring power currents generated by the motors together at the input shaft of the gear unit, the motors having an outlet for the coolant, and ducts being formed on the adapter flange, in a wall of the adapter flange, adapted to bring the coolant, emerging at each motor outlet, together at a single outlet in common on the adapter flange.

11. The geared motor according to claim 10, wherein the input shaft of the gear unit is supported in a housing part of the gear unit and/or a bearing cup, the housing part being adjusted to a further housing part of the gear unit by a centering collar, and joined.

12. The geared motor according to claim 10, wherein the summation gear has a center gear, a toothing part, and/or a spur gear, which is mounted in rotatably fixed manner on the input shaft of the gear unit, a toothing being formed on each rotor shaft or a toothing part being joined to each rotor shaft, and/or pinions having toothing being joined in rotatably fixed manner to the rotor shaft, the pinions meshing with the center gear.

13. The geared motor according to claim 10, wherein the adapter flange forms a housing for the summation gear.

14. The geared motor according to claim 10, wherein the adapter flange and/or a wall of the adapter flange, is constructed in two pieces, so that it has a sheet metal on which the ducts are formed and/or as a depression and/or a groove.

15. The geared motor according to claim 10, wherein in each case, the outlet of the motors is connected imperviously to an inlet formed on the adapter flange, to an inlet formed from sheet metal of the adapter flange, to a duct, the inlet being a mouth of one of the respective ducts.

16. The geared motor according to claim 10, wherein: the motors and/or pinion toothings on the rotor shafts of the motors are set apart uniformly from each other in the circumferential direction of the gear-unit input shaft; and/or a pinion joined in rotatably fixed fashion onto the rotor shaft of a motor is supported only via the two bearings of the rotor shaft; and/or the center gear is supported with the gear-unit input shaft in a housing part and/or a bearing cup of the gear unit; and/or the adapter flange has a centering device which is adjustable to a centering device and/or a centering collar, of the gear-unit housing part; and/or an accommodation and/or an accommodation opening is located on the adapter flange and has a centering device and/or a centering collar to which the end shield of a motor is adjusted; and/or the motors are arranged as synchronous motors or at least have permanent magnets; and/or between three and eight motors being disposed in a circumferential direction and/or being set apart evenly in the circumferential direction.

17. The geared motor according to claim 10, wherein coolant ducts of a stator housing of the motor are brought together in an end shield at one opening area in common as outlet, and/or in the other end shield of the motor, the coolant ducts of the stator housing of the motor being brought together to one opening area in common as an inlet for the coolant, and/or the summation gear is lubricated with cooling liquid, by extending a through-opening and/or a connecting duct from a spatial area of the summation gear to a duct of the adapter flange.

\* \* \* \* \*